United States Patent

[11] 3,582,856

[72] Inventors Donald L. Watrous
Liverpool;
John D. Harnden, Jr., Schenectady, both of, N.Y.
[21] Appl. No. 834,372
[22] Filed June 18, 1969
[45] Patented June 1, 1971
[73] Assignee General Electric Company
New York, N.Y.
Division of Ser. No. 768,693, Oct. 18, 1968, Pat. No. 3,487,345, which in turn is a Division of Ser. No. 635,577, Pat. No. 3,464,225.

[54] TEMPERATURE SENSING RELAY
2 Claims, 11 Drawing Figs.
[52] U.S. Cl. ................................. 337/382, 337/393
[51] Int. Cl. ............................. H01h 37/32, H01h 37/46
[50] Field of Search ........................... 73/368.3; 337/140, 382, 388, 390, 393; 200/152.9, 159B

[56] References Cited
UNITED STATES PATENTS
| | | | |
|---|---|---|---|
| 3,516,082 | 6/1970 | Cooper | 337/393(X) |
| 3,403,238 | 9/1968 | Buehler et al | 337/393 |
| 3,381,469 | 5/1968 | Schwartz | 73/368.3(X) |
| 3,360,625 | 12/1967 | Nickelson | 200/152(.9) |
| 3,254,180 | 5/1966 | Flanagan | 337/140(X) |
| 3,080,756 | 3/1963 | Baker | 73/368.3 |
| 3,019,653 | 2/1962 | Swales et al. | 73/368.3 |
| 3,001,401 | 9/1961 | Vernet et al. | 73/368.3(X) |
| 2,990,716 | 7/1961 | Butts | 337/393(UX) |
| 2,040,919 | 5/1936 | Cladwell | 200/159(B) |

OTHER REFERENCES
J. S. Friesmuth et al., " High Force Thermostatic Actuators," Product Engineering, July 1960

Primary Examiner—Harold Broome
Assistant Examiner—Dewitt M. Morgan
Attorneys—John F. Ahern, Paul A. Frank, Donald R. Campbell, Joseph B. Forman, Frank L. Neuhauser and Oscar B. Waddell ABSTRACT: Temperature sensors in pilot contact and sensor relays are comprised by first order transition materials which provide an abrupt change in at least one of the properties thereof, in particular volume, at predesigned transition temperatures in response to variations in temperature over a given range. Due to the hysteresis characteristics built into the sensors through the use of suitable first order transition materials, the transition temperature values will be different as the temperature increases from a lower to a higher temperature from the transition temperature value as the temperature decreases from a higher to a lower temperature. Preferably a two-part sensor is used employing high and low metallic compound transition temperature materials. An application is a solid state refrigerator control circuit operating with two-point temperature control.

Inventors:
Donald L. Watrous,
John D. Harnden, Jr.
by Paul A. Frank
Their Attorney.

Inventors:
Donald L. Watrous,
John D. Harnden, Jr.
by Paul A. Frank
Their Attorney.

TEMPERATURE SENSING RELAY

This application is a division of Ser. No. 768,693 filed Oct. 18, 1968, now U.S. Pat. No. 3,487,345, which in turn is a division of Ser. No. 635,577 filed May 2, 1967, now U.S. Pat. No. 3,464,225, both assigned to the same assignee as the present invention.

This invention relates to new and improved temperature regulation systems, and particularly to new and improved electronic refrigeration systems.

More specifically, the invention relates to new and improved electronic temperature regulation systems (and electronic refrigeration systems in particular) using solid-state semiconductor switching devices and solid-state, pilot contact sensors, and to the improved solid-state sensors employed therein.

In temperature regulation systems such as are exemplified by the control system of an electric refrigerator, there are a number of characteristics required of the system in order that it function properly for its intended purpose. Certain of the more important of these requirements is that the system have the capability of correctly sensing the temperature of a space whose temperature is being regulated (within prescribed tolerances) either directly, or indirectly by sensing some other condition which can be related to the temperature of the space being regulated. The system thereafter must be capable of comparing the sensed temperature to a desired standard and converting the resultant error (if any) into action or inaction on the part of a temperature controlling apparatus (such as the compressor motor of a refrigerator, etc.).

Known temperature regulating systems which possess the above listed capabilities employ known electromechanical types of temperature sensors which generally provide some form of mechanical movement, such as might be typified by the expansion or contraction etc a bellows, as an indicia of the temperature being sensed. This mechanical movement thereafter is amplified by suitable mechanical linkage arrangements, and employed to control operation of the temperature controlling apparatus. Such known schemes possess many objectionable characteristics such as difficulty of initial manufacture, installation and calibration requiring complicated and expensive manufacturing methods and machinery, and requiring cost increasing factory adjustments. Further, such known arrangements are susceptible to misalignment during normal use as a result of mechanical shock or vibration encountered as a result of moving, etc., as well as misalignment due to thermal unbalances caused by extreme heat or cold. In order to overcome these difficulties the present invention was devised.

It is therefore a primary object of the invention to provide new and improved, solid state, electronic temperature regulation systems (and to an electronic refrigeration system in particular) employing all solid-state devices which are not easily misaligned due to mechanical and thermal stresses caused by shock, vibration, high temperature, low temperature, etc., and which allow for convenient remote location of the temperature sensors relative to the power semiconductor devices which they actuate.

Another object of the invention is to provide such systems which are capable of a two-point stepped control as explained hereinafter wherein the control point is different for increasing temperatures from that employed for decreasing temperatures.

Still another object of the invention is the provision of temperature regulation systems having the above set forth characteristics wherein new and improved solid-state, pilot contact sensors are employed which provide abrupt, snap-action changes at the temperature control points with respect to time in response to changes in temperature, this characteristic being essential in order to assure reliable operation of the electrical circuitry comprising a part of the overall system with which the sensors are used.

A further object of the invention is the provision of such systems which do not require the pilot contacts associated with the solid-state sensors to carry load current thereby simplifying their fabrication and assuring them of a long operating life. This also eliminates calibration problems due to self-generated heat on the part of the pilot contacts if the contacts were required to carry load current.

Still a further object of the invention is to provide improved temperature regulation systems incorporating the above listed features which do not require extensive and complicated mechanical linkages.

Another further object of the invention is the provision of such systems which utilize solid-state sensors that are inherently calibrated correctly at the time of manufacture and which obviate the need for complicated and expensive factory adjustments to the systems in which they are used at the time of installation in an appliance, etc.

In practicing the invention, improved, electronic temperature regulation systems (and electronic refrigeration systems in particular), are provided which include at least one electrically operable apparatus (such as the compressor motor of a refrigerator) for driving the temperature controlling mechanism (compressor of the refrigerator) of the temperature regulation system. At least one solid-state semiconductor switching device (such as a gate controlled triac) is connected in series circuit relationship with the electrically operable apparatus for controlling the supply of electric current thereto. A solid-state, pilot contact and sensor means is provided for sensing the condition of a point in a space, the condition of which is directly related to the temperature of the space being regulated by the temperature regulation system. The pilot contact and sensor means is designed to exhibit a desired thermal hysteresis characteristic and is connected between a source of electric current and the control gate of the gate controlled, solid-state semiconductor switching device for controlling turn-on of the same in response to the condition of the point being sensed. The pilot contact and sensor means is comprised by a two-part member, each part being comprised of a first order transition material which provides an abrupt change in at least one of its properties at predesigned transition temperatures in response to variations in temperature over a given range. The two-part member comprised of first order transition materials is fabricated so as to possess a thermal hysteresis characteristic such that the transition temperature value is different as the temperature in the space increases from a lower to a higher temperature from the transition temperature value obtained as the temperature in the space decreases from a higher to a lower temperature.

As indicated above, a preferred use of the improved systems are as a refrigeration control system wherein the electric motor is a compressor motor and the system further includes a circulating fan for the cool air spaces operatively coupled in parallel with the compressor motor so as to be controlled by the gate controlled, solid-state semiconductor switching device in unison with the compressor motor. The refrigeration control systems also preferably include defrost means for defrosting the evaporator coils of the refrigerator at appropriate times, and a second gate controlled, solid-state semiconductor switching device connected in series with the defrost means for controlling its operation. Second, solid-state, pilot contact and sensor means are operatively coupled to the control gate of the second gate controlled semiconductor switching device for controlling its turn-on in response to a need for defrost. The second pilot contact and sensor means is thermally coupled to the evaporator coils of the refrigerator system for sensing buildup in frost and is designed to exhibit a desired thermal hysteresis characteristic. The refrigeration system is completed by interlock means for interlocking operation of the compressor motor and circulating fan with operation of the defrost means.

For use in the above described temperature regulation systems, new and improved temperature responsive, pilot contact and sensor relays are provided which comprise a set of movable, magnetically operable contacts for establishing electric current flow therethrough. A source of magnetic flux (such as a permanent magnet) is disposed adjacent the set of magnetically operable contacts for actuating the same and a flux gate is interposed adjacent the set of magnetically operable contacts and the source of magnetic flux for controlling application of the magnetic flux to the contacts to actuate the same. The flux gate comprises at least one two-part member comprised of first order transition materials which exhibit abrupt changes in their magnetic permeability at a predesigned transition temperature. Additional forms of solid-state sensors fabricated from first order transition materials also are provided.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 11:
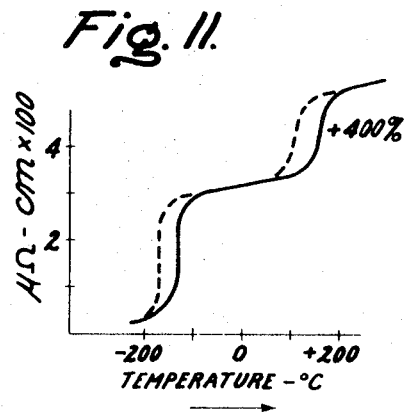
Figure 10:
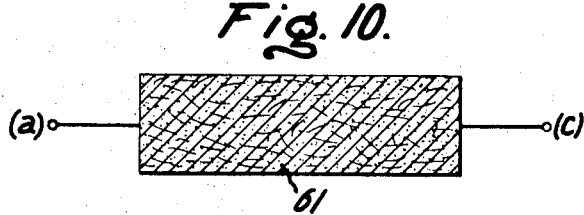

FIG. 10 is a diagrammatic sketch of a solid-state pilot contact and sensor relay device employing the change in electrical resistivity characteristic of certain first order transition materials; and FIG. 11 is a characteristic curve illustrating the change in electrical resistivity of a known first order transition material which exhibits different transition temperatures and which is suitable for use in the device shown in FIG. 10.

SOLID-STATE ELECTRONIC TEMPERATURE REGULATION SYSTEM

Figure 1:
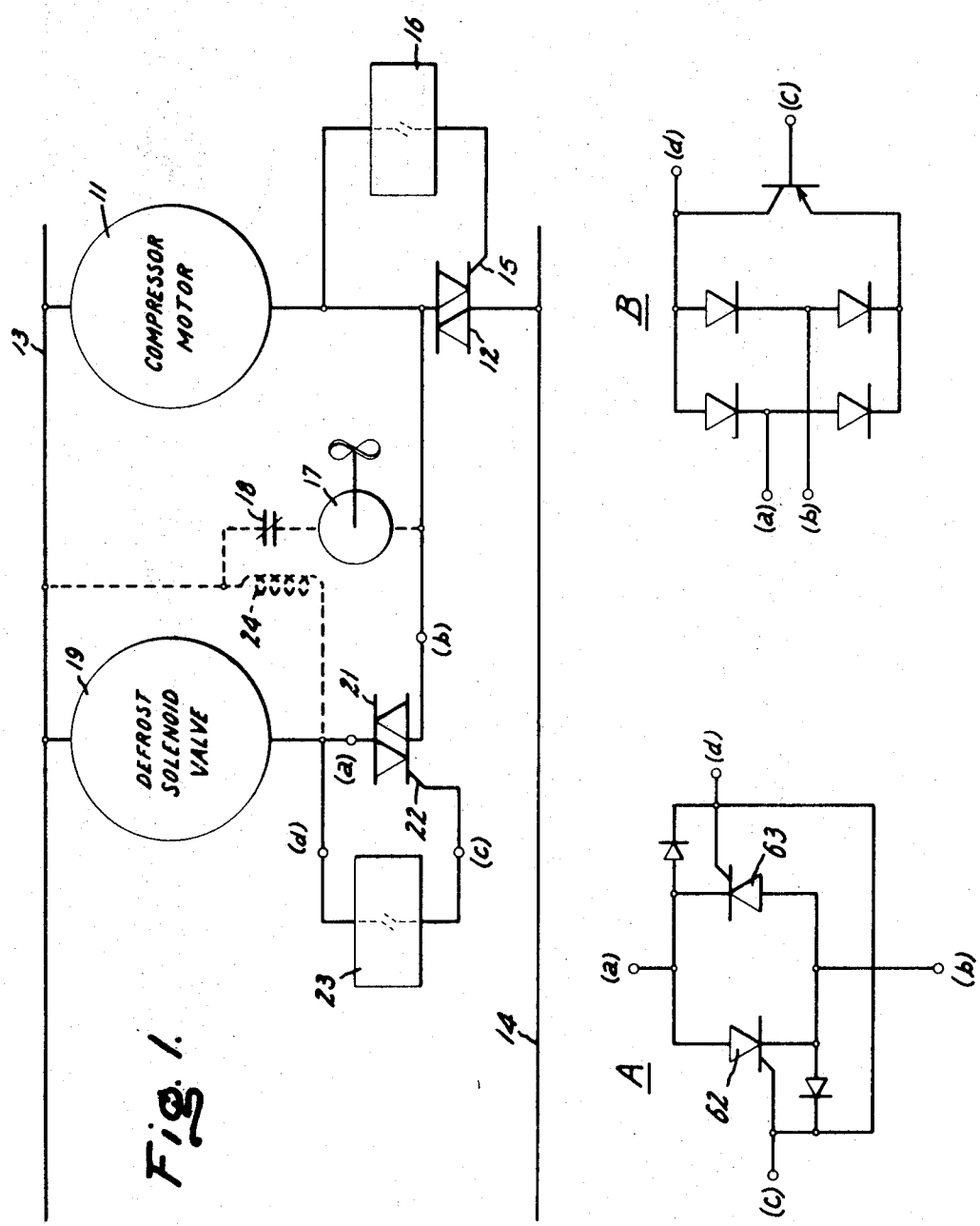
FIG. 1 is a functional block diagram of an improved, electronic, solid-state refrigerator control system constructed in accordance with the present invention.

FIG. 1 of the drawings illustrates a new and improved temperature regulation system, and more particularly a new and improved, electronic refrigerator control system employing solid-state components, and constructed in accordance with the present invention. The electronic refrigerator control system shown in FIG. 1 is comprised by a compressor motor 11 which is connected in series circuit relationship with a solid-state semiconductor switching device 12 between a pair of electric power supply terminals 13 and 14. The solid-state semiconductor switching device 12 preferably comprises a triac, bilateral conducting semiconductor triode (hereinafter referred to as a triac), the characteristics of which are well known and are described more fully in a textbook entitled "Semiconductor Controlled Rectifiers" by F. E. Gentry, F. W. Gutzwiler, Nick Holonyak, Jr., and E. E. Von Zastrow published by Prentice Hall, Inc., Englewood Cliffs, New Jersey. While a triac is preferred for use as the solid-state, semiconductor switching device 12, other known forms of such devices can be employed. For example, light activated silicon controlled rectifiers, magnetically triggered silicon controlled rectifiers, power diacs, dv/dt fired silicon controlled rectifiers, back to back reverse polarity connected silicon controlled rectifiers or power transistors could be used as the switching device 12.

Triac 12 is capable of conducting electric current therethrough in either direction depending upon the polarity of the alternating current supply potential applied through supply terminals 13 and 14, upon the application of a gating-on current applied to its control gate element indicated at 15. The gating-on current may be either of positive or negative polarity and should be applied through suitable current limiting components in the usual manner. In order to supply this gating-on current to the control gate 15 of triac 12, a solid-state, pilot contact and sensor means shown at 16 is provided and, in effect, is connected between the control gate 15 and a source of electric current comprised by the supply terminal 13 through the compressor motor 11. The solid-state, pilot contact and sensor means 16 is designed to sense the temperature of a space, the temperature of which is directly related to the temperature being regulated by the temperature regulation system (such as the cold space of a refrigerator). The construction and manner of operation of the pilot and contact sensor means 16 will be described more fully hereinafter; however, at this point it is sufficient to point out that it is designed to exhibit a desired width thermal hysteresis characteristic (as will be explained hereinafter) and serves to control turn-on of the triac 12 in response to the temperature being regulated.

Since the temperature regulation system shown in FIG. 1 has been described as comprising a refrigerator control system, it normally will include a circulating fan shown at 17 for circulating cool air within the cool air spaces of the refrigerator. The circulating fan 17 is connected through the normally closed contacts 18 of a solenoid actuated relay in series circuit relationship with the triac 12 across the power supply terminals 13 and 14 so that, in effect, it is connected in parallel circuit relationship with the compressor motor 11 and is operated in unison therewith by the triac 12.

In addition to the circulating fan 17, the refrigerator control system normally, preferably will include defrost means for defrosting the evaporator coils of the refrigerator at appropriate times. In preferred embodiments of the invention, the defrost means is comprised by a solenoid actuated, reversing defrost valve 19. Valve 19 constitutes a well-known reversing valve for reversing or changing the direction of the flow of the hot refrigerant gases appearing at the discharge end of the compressor prior to being passed through the condenser so as to direct these hot gases through small defrost tubes placed adjacent the coils of the evaporator for defrosting purposes. Such reversing valves and hot gas defrost systems are well known in the art and are described fully in any of the known texts on the design of refrigeration systems. For example, the reversing valve may comprise a commercially available four-way valve manufactured by the Controls Company of America—Heating and Air Conditioning Division—Milwaukee, Wis. and identified as the "284" four-way reversing valve.

Hot gas defrosting systems are well known as such and are provided on many commercial refrigerators. For example, certain of the refrigerators manufactured and sold by the General Electric Company include a "frost-guard" defrost system wherein the hot gas defrost tubing is fabricated as an integral part of the evaporator tubing and is directly thermally coupled thereto through a connecting web. Such "frost-guard" defrost systems are described fully in any of the instruction manuals supplied to purchasers of refrigerators including the "frost-guard" defrost system. The solenoid actuating winding of the reversing solenoid defrost valve 19 is connected in series circuit relationship with a second, solid-state, gate controlled semiconductor switching device 21 formed by a triac. The triac 21 has its control gate 22 supplied from a second, solid-state, pilot contact and sensor means 23 whose characteristics will be described more fully hereinafter. The second pilot contact and sensor 23 is operatively coupled between the control gate 22 of triac 21 and a source of electric current comprised by the terminal 13 through the solenoid actuating winding of the reversing defrost valve 19.

For interlock purposes, the series connected second triac 21 and reversing defrost valve 19 are connected in series circuit relationship with the first triac 12. By connecting the circuit in this manner, it is assured that the defrost valve will be actuated only while the compressor motor 11 is running, thereby assuring a flow of the hot refrigerant gases through the defrost tubing. It is also desirable during defrost that the circulating fan 17 be disconnected. For this purpose, the solenoid actuating winding 24 of the normally closed contact 18 is connected in series circuit relationship with the second triac 21 so as to be actuated thereby in unison with the reversing defrost valve 19. As a consequence of this arrangement, upon the triac 21 being turned on by its associated defrost control pilot contact and sensor 23, both the reversing defrost valve 19 and the solenoid winding 24 will be energized. This results in reversing the flow of the hot refrigerant gases away from the condenser and into the defrost tubing, and simultaneously interrupts operation of the circulating fan 17. The defrost control pilot contact and sensor 23 is remotely located at an appropriate point on the evaporator coils for sensing the buildup of frost thereon and for actuating the second triac 21 upon sensing such frost buildup.

During normal operation of the refrigeration system shown in FIG. 1, the compressor motor 11 will be turned on whenever the temperature in the cooled spaces of the refrigerator rises above a predetermined set value. This will occur when the cold control pilot contact and sensor 16 senses a rise in temperature within the cooled spaces above a preset value and applies a gating-on current to the control gate of the triac 12. Thereafter, the triac 12 will supply alternating current to the compressor motor 11 for so long as the cold control pilot contact and sensor 16 calls for cooling. After a sufficient period of cooling, the cold control pilot contact 16 will open and interrupt the supply of further gating-on current to the control gate of triac 12. Upon such occasion, further operation of the compressor motor 11 will be prevented. Thereafter, for so long as the cooled space remains within the preset temperature ranges established by the cold control pilot contact sensor 16, the circuit remains inactive until the temperature in the space again rises above the predetermined temperature whereupon the cooling cycle of operation is again repeated.

The above-described cyclical operation of the compressor motor 11 will continue indefinitely until such time that the second defrost control pilot contact and sensor 23 senses an accumulation of frost on the evaporator coils of the refrigerator. Upon this occasion, the second triac 21 will be turned on by the application of gating-on current to its control gate 22 so as to actuate the reversing defrost valve 19 and inactivate the circulating fan 17. Operation of the reversing defrost valve 19 and inactivation of the circulating fan 17 are, of course, dependent upon operation of the first triac 12 so that the defrost cycle will not commence until the cold control pilot contact and sensor 16 calls for operation of the compressor motor 11. Upon this condition being satisfied, the system will function to pump hot refrigerant gases appearing at the outlet of the compressor through the defrost tubing so as to accomplish defrosting of the refrigerator in a well-known manner. Upon completion of the defrosting cycle, the defrost control pilot contact and sensor 23 will open and interrupt the supply of further gating-on currents to the control gate 22 of second triac 21. Upon this occurrence, the system returns to its usual operating pattern to thereby maintain the refrigerator in a defrosted condition within a desired cooled temperature range.

While the new and improved temperature regulation system illustrated in FIG. 1 has been indicated as being designed for use with a refrigeration system, it should be expressly noted that the invention is in no way limited to use with refrigeration systems only. The use of solid-state switching devices in conjunction with solid-state, point control pilot contact and sensors will be advantageous in many types of temperature regulation systems such as are typified by air conditioning systems, heat pump systems, home heating systems, freezers, small home appliances such as electric frying pans, irons, etc. The general applicability of the solid-state character of the system will be appreciated more fully hereinafter.

Desired Temperature Responsive Characteristics

The desirable characteristics of a temperature regulation system outlined generally in the early portions of the specification did not sufficiently emphasize the importance of a characteristic operational feature of such systems which shall be identified as two-point temperature control. In most temperature regulation systems, in order to minimize cycling on and off of the electrically operable apparatus for adjusting the temperature being regulated by the temperature regulation system (for example the compressor motor) it is desirable for a system, such as that shown in FIG. 1 to cause the compressor to be turned on at one temperature value and to be turned off at a second lower temperature value. That is to say, if the temperature in the refrigerator is to be maintained within a temperature range of 10° to 20° Centigrade, then the system should be designed so that the compressor motor is turned on at about 18° Centigrade (due to thermal lag) and is not turned off until the temperature in the space is reduced to about 8° Centigrade. Thus, there will be a range of 10° Centigrade from 8° to 18° within which variations of the temperature within the refrigerator space will not cause operation of the compressor motor. This is to be contrasted to a system which employs a one-point control wherein the system would operate the compressor motor at say 15° Centigrade. As the temperature in the space of the refrigerator varies from 15°, the compressor motor would be operated. As a consequence, each time the refrigerator door is opened, with a one point control, the compressor motor would be operated thereby imposing a much greater duty cycle on the motor as well as the other components of the system, and decreasing the expected operating life of the system.

Temperature regulation systems, and in particular refrigeration control systems, employing two-point temperature control are well known in the art. Thus, there is nothing recited in the preceding paragraph which is broadly new. However, as set forth in the earlier portions of the specification, in order to achieve two-point temperature control these known systems require complex and expensive to adjust, easily misaligned mechanical linkages which are subject to the many objectionable characteristics listed. To obviate these objectionable characteristics, the temperature regulation system of the invention, as typified by the refrigerator control system of FIG. 1, employ solid-state switching devices 12 and 21 and remotely located, solid-state, pilot contact and sensors 16 and 23 which electrically control the more conveniently located solid-state switching devices 12 and 21. Thus, the need for complicated mechanical linkages with their attendant expensive factory adjustments and susceptibility to misalignment during use, is avoided. The nature of the pilot contact and sensors 16 and 23, and the manner in which they function to provide a two-point temperature control for the system of FIG. 1 will be described more fully hereinafter.

In addition to the capability of providing two-point temperature control as outlined above, it is essential that any suitable, electrically operable temperature regulation system also possess the capability of providing a sharp or snap-action-type of indication that the temperature being sensed has passed through a critical value, measured with respect to time. This characteristic is important with respect to reliable operation of the electrical circuitry associated with the system, particularly if the circuitry includes inductive components such as motors, etc. More specifically, if the sensor's characteristics are such that it gradually or proportionally changes in response to the temperature being sensed, passing through a critical value, the electrical circuitry associated with the sensor (particularly the gating of the gate controlled triac 12 shown in the system of FIG. 1) will have to be designed so that the triac 12 is provided with a clean-cut clear command to turn on in the form of a sharp increase in current measured with respect to time. If the system does not possess this sharp or snap-action-type of characteristic, the associated electrical circuitry may linger somewhere between a fully turned-on and a fully turned-off condition for prolonged periods which are deleterious to the system components and can cause the system to operate unsatisfactorily. Hence, the provision of a sharp or snap-action indication of passage through a critical temperature value is an essential characteristic of any suitable system, in addition to the two-point temperature controlling capability outlined above.

Temperature Sensitive First Order Transition Material Sensors

There are a number of known metallic materials that exhibit a remarkable change in certain of their properties in response to changes in temperature. The change in property may be exhibited by a change in magnetic characteristics, a change in volumetric characteristics or a change in electrical resistivity characteristics. The changes in property, which occur at a specific transition temperature, are accompanied by a solid-state, first-order phase change (in a thermodynamic sense) without change in crystal structure, and are different (in most instances) from the change that occurs at the Curie temperature. By properly tailoring this group of known metallic materials, the transition temperature can be made to occur over a wide range of temperature values by suitable modification of the metallic compounds. Similarly, by appropriate combining of the materials (such as a high temperature material with a low temperature material in a two-part member) they can be made to exhibit any desired width thermal hysteresis effect (within prescribed ranges) wherein the transition temperature, as the temperature increases from a lower to a higher temperature value, is different from the transition temperature as the temperature decreases from a higher to a lower temperature value. Further, the sharpness of the transition also can be controlled by the initial processing used, i.e., composition, heat treatment, etc. Thus, by appropriate processing, the values at which the transition temperatures occur, the width of the thermal hysteresis (i.e., the difference in the transition temperatures for increasing and decreasing temperature values) and the sharpness of the transition all can be controlled to a required extent in order to provide a solid-state, temperature sensor that is extremely well adapted for use in temperature regulation systems according to the invention.

Although certain of these metallic materials have been known for some time, most research relating to them has been accomplished in the last decade. There are now over a dozen known compounds that exhibit most of the unique properties outlined above and are the result of research which has been reported in the United States, and other countries of the world such as Japan, Russia, Hungary, and others. See, for example, the paper by D. S. Rodbell and C. P. Bean, entitled "Some Magnetic First Order Transitions," *Journal of Applied Physics*, supplement to Volume 33, number 3, pages 1,037 to 1,041, Mar. 1962. Certain of these known first order transition materials exhibit transition temperatures well below zero degrees centigrade. However, for many of the materials, the transition temperatures occur near zero degrees centigrade and above, and are considered to be of interest for use in the fabrication of suitable sensors to be employed in systems such as that shown in FIG. 1. The materials of most interest are manganese arsenide (MnAs); iron rhodium (FeRh); and chromium doped manganese antimonide (MnCrSb). The transition temperatures of these materials can be made to lie within the approximate temperature range of from minus 200 to plus 200 degrees Centigrade. The techniques for processing these materials, i.e., the composition, heat treatment, etc., required to produce solid-state sensors possessing the above-listed capabilities are reported in the published literature identified in such articles as the Rodbell and Bean publication identified above, and hence, it is believed unnecessary to elaborate further as to their processing. However, with regard to the desired characteristics which the sensors should be designed to exhibit, the following discussion is provided.

Temperature Sensitive Magnetic Materials

Figure 3:
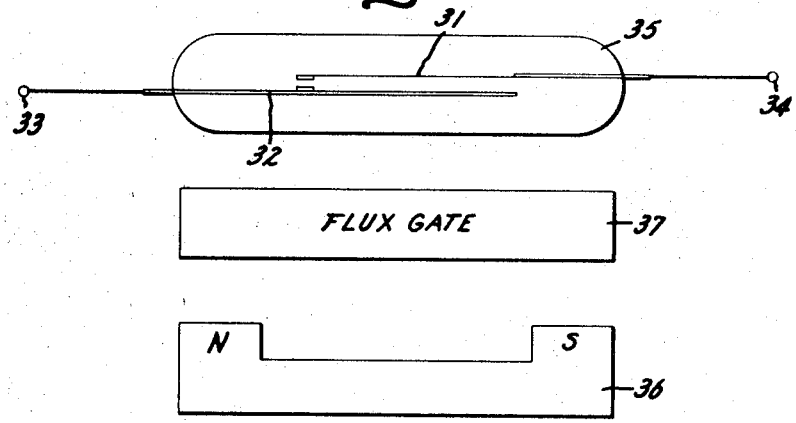
FIG. 3 is a schematic diagram of a new and improved, temperature responsive magnetically operable pilot contact and sensor relay constructed in accordance with the invention for use in the systems shown in FIGS. 1 and 2.

FIG. 3 of the drawings is a schematic diagram of one form of temperature-responsive pilot contact and sensor relay constructed in accordance with the invention, and suitable for use as the pilot contact and sensor means 16 and 23 of the system shown in FIG. 1. In FIG. 3, a set of movable, magnetically operable contacts are shown at 31 and 32 for controlling current flow between the terminals 33 and 34. The magnetically operable contacts 31 and 32 may, in fact, comprise the contacts of a conventional, commercial reed switch enclosed within a suitable evacuated envelope indicated at 35. The reed switch 35 is positioned adjacent a source of magnetic flux comprised by a permanent magnet 36. Interposed between the permanent magnet 36 and the reed switch 35 is a flux gate 37 for controlling the application of magnetic flux to the contacts 31 and 32 from the permanent magnet 36. The flux gate 37 comprises a member formed from a first order transition material which exhibits an abrupt change in its magnetic permeability at specific transition temperatures as will be described more fully hereinafter. Thus, it will be appreciated that if the flux gate 37 is fabricated from a material which is nonmagnetic or antimagnetic at temperatures below the transition temperature, and thereafter becomes magnetic, that as the temperature being sensed passes through the transition temperature value, the flux gate 37 will allow magnetic flux to act on the reed switch contacts 31 and 32 to cause the same to close. Subsequently, as the temperature cools below the critical value, the flux gate 37 will again become antimagnetic and prevent magnetic flux from acting on the contacts 31 and 32. As a consequence, the contacts 31 and 32 will automatically open to interrupt current flow between the terminal points 33 and 34. If desired, the device shown in FIG. 3 may be employed to monitor current flow directly. For example, should it be desired to monitor current flow to a motor winding etc., current can be supplied to the winding through the flux gate 37 which is connected as an element in the excitation circuit. Should the current exceed design specifications, the flux gate (due to the heat generated therein by the overcurrent), passes through a transition and activates the relay. With such an arrangement, a suitable bias current supplied to the flux gate 37 could be employed to adjust the operating point on the characteristic curve to a desired value.

Figure 4:
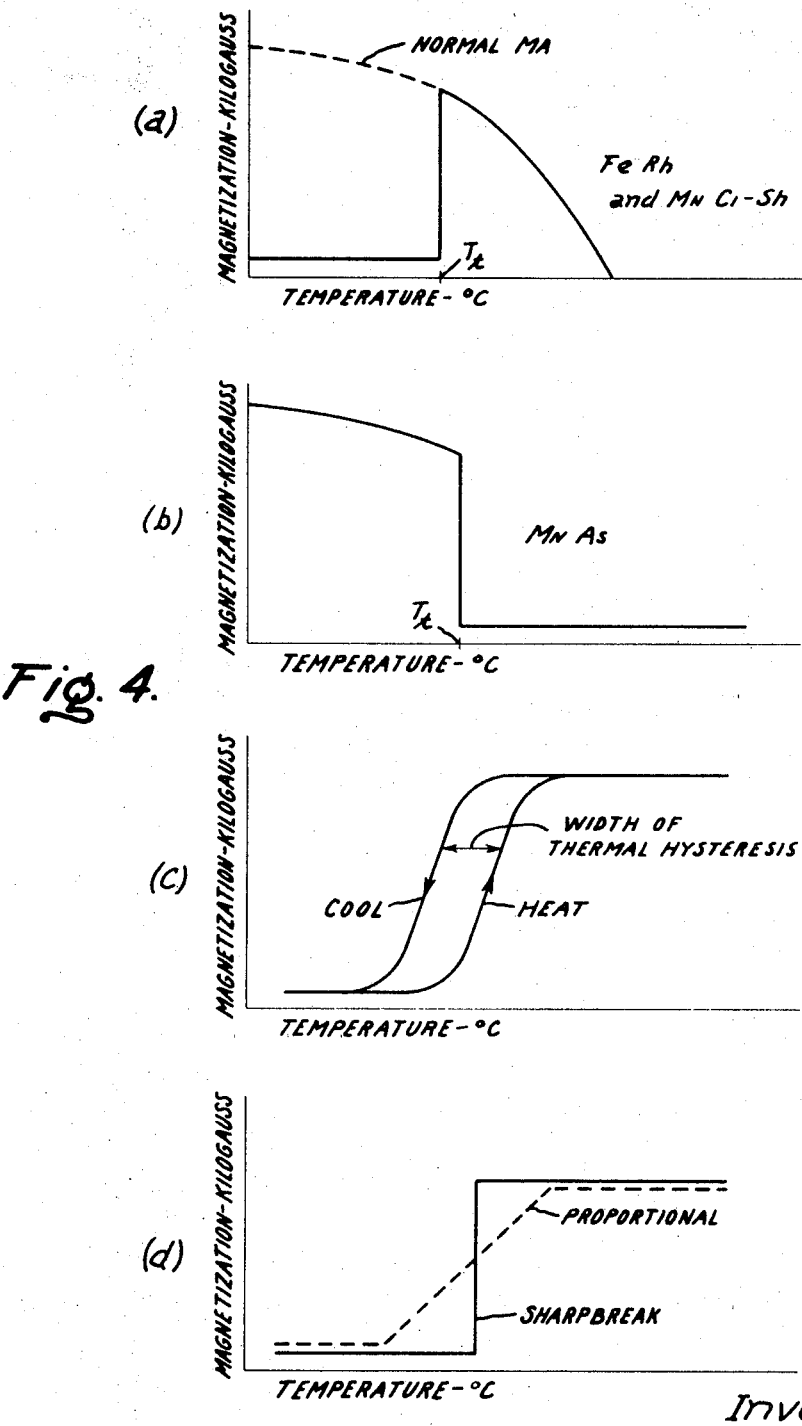
FIG. 4 is a series of magnetization versus temperature characteristic curves illustrating the nature of the operation of the relay shown in FIG. 3.

FIG. 4($a$) of the drawings illustrates the magnetization (measured in kilogauss) versus temperature (measured in degrees centigrade) characteristics of two compositions comprised mainly of iron rhodium and chromium doped manganese antimonide. FIG. 4($b$) of the drawings illustrates the magnetization versus temperature characteristic of a composition comprised primarily of manganese arsenide. From a consideration of these curves, it will be seen that first order transition materials whose compositions comprise essentially iron rhodium or chromium doped manganese antimonide, are essentially nonmagnetic or antimagnetic up to a specific transition temperature ($T_t$), and thereafter the magnetic permeability of the material increases sharply to the normal magnetization level of the material (as exemplified by the normal magnetization curve of manganese antimonide indicated by the dotted line). This normal magnetization curve is typical of the change in magnetization of most magnetic materials with increasing temperature. In contrast, the magnetization curve for manganese arsenide at lower temperatures follows the normal magnetization curve of a magnetic material, and at the transition temperature quickly becomes nonmagnetic or antimagnetic. The addition of suitable amounts of known dopents to each of these compounds causes the transition temperature to be shifted to higher or lower temperature values, as desired. In each of the compositions, some residual magnetization generally is present in the so-called nonmagnetic or antimagnetic state; however, this ordinarily is less than 1 percent. The temperature range over which it is considered possible to cause the abrupt transition to occur, extends between −200° C. and +200° C. Additional known materials which exhibit a desired sharp transition in their magnetic characteristic within the temperature region of interest are certain ferrite materials which exhibit low Curie temperatures. Materials of this nature are identified in an article by K. Murakami entitled, "The Characteristics of Ferrite Cores with Low Curie Temperature and Their Application," appearing in the *I.E.E.E. Transactions on Magnetics*, June 1965 issue, pages 96 to 100.

Another important property of the materials listed above in connection with the transition appearing therein, is their thermal hysteresis characteristic as shown in FIG. 4(c). As a result of this thermal hysteresis characteristic, when applying heat to the material, the transition temperature $T_t$ will be at one value, and will occur at a different lower value during cooling of the material. The width of the thermal hysteresis of these materials (indicated by the diverging arrows) can be varied over a range in the order of 1° C. to 20° C. by appropriately controlling the processing of the materials. A preferred manner of controlling the width of the thermal hysteresis, however, is to employ a two-part member wherein one part is comprised of a material having a relatively low transition temperature and the other part is comprised of material having a relatively higher transition temperature.

A further desirable characteristic of the transition occurring in the above-mentioned first order transition materials is the slope of the transition as exemplified by the curve shown in FIG. 4(d). Again by properly controlling the processing of the materials, a sharp break (snap-action) characteristic (measured with respect to temperature) can be approached as shown by the solid lines in FIG. 4(d) wherein the transition occurs within a temperature range of only a few degrees. Alternatively, if desired, the transition can be made to occur over a wide range as indicated by the dotted line whereby proportional control can be achieved. However, in the wide transition materials, it may become difficult to obtain sufficiently uniform characteristics so as to assure reliable operation of the electrical circuitry associated with sensors fabricated in this manner.

Figure 5:
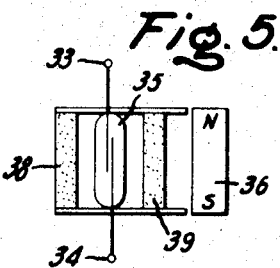
FIG. 5 is a schematic diagram of still a different form of temperature responsive magnetically operable pilot contact and sensor relay fabricated in accordance with the present invention.
Figure 6:
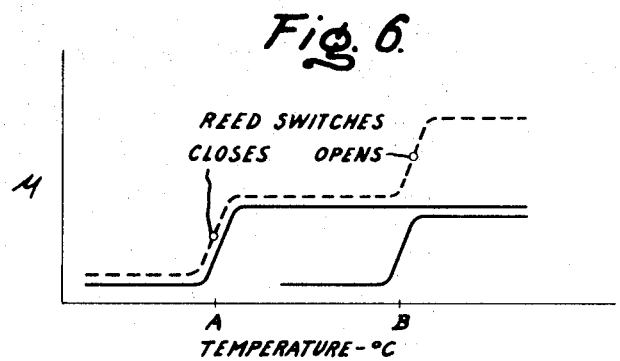
FIG. 6 is an operating characteristic curve illustrating the manner of operation of the relay device shown in FIG. 5.

FIG. 5 of the drawings illustrates a different form of temperature sensitive, magnetically operable pilot contact and sensor relay constructed in accordance with the invention. The relay shown in FIG. 5 of the drawings similarly could be employed as the pilot contact and sensor element 16 and 23 of the system shown in FIG. 1, and operates in accordance with the same principles as the relay shown in FIG. 4. However, the relay shown in FIG. 5 differs from that in FIG. 4 in that two flux gates shown at 38 and 39 are positioned adjacent a magnetically operable reed switch 35 so as to control the application of magnetic flux thereto from the permanent magnet 36. In this construction, the flux gate member 38 is formed from a low temperature first order transition material or low temperature ferrite and the flux gate 39 is formed from a high temperature first order transition material or high temperature ferrite. The magnetization versus temperature characteristic of the relay shown in FIG. 5 is illustrated in FIG. 6 of the drawings. In FIG. 6, the change in magnetization resulting from a change in temperature of the low temperature flux gate 38 is shown by the solid line as having a transition temperature A, and the temperature flux gate 39 is shown as having a higher value transition temperature B. By appropriately combining and tailoring the compositions of both the low temperature and the high temperature flux gates, an overall characteristic such as that shown by the dotted lines can be achieved wherein the reed switches will be closed at point A for increasing temperature and opened at temperature B. For decreasing temperatures the reverse procedure occurs.

Operation of the relay shown in FIG. 5 is achieved by designing the low temperature flux gate 38 to be nonmagnetic at temperatures below A, and to become magnetic at the transition temperature A. As a consequence, a good flux path is established between magnet 36 and flux gate 38 at temperature A, part of which will be diverted to operate the contacts of the reed switch 35 to cause the switch to close. Thereafter, with increasing temperature at point B, the high temperature flux gate (which heretofore has been nonmagnetic) becomes sufficiently magnetizable to shunt actuating flux away from the contacts of reed switch 35. During cooling the reverse procedure occurs. It should be noted, however, that in order not to unduly complicate the magnetization versus temperature curve shown in FIG. 6, the thermal hysteresis associated with the curve has not been illustrated. In actuality, the curve shown in FIG. 6 would correspond more closely to the characteristic curve shown in FIG. 8 (for a volumetric switch) where due to thermal hysteresis of each of the flux gates 38 and 39, the reopening and reclosing of the reed switch at points B and A, respectively, during cooling will be at somewhat different transition temperature values than those encountered during heating.

Temperature Sensitive Materials Exhibiting Change in Volumetric Properties

In addition to the characteristics described above, certain of the materials listed along with others, exhibit pronounced abrupt changes in dimensional and volumetric properties as the temperature is increased through a critical transition temperature value. For the compound MnCrSb, the length of the tetragonal or c-axis, increases, while the mutually perpendicular a-axis contacts. Because the change in the a-axis is much less than the change in the c-axis, a net volume increase of about 0.1 percent is obtained. The magnitude of the total dimensional and volumetric change in any given one of these materials is a function of the transformation temperature, and generally is greatest at low temperature values. Typical values of change in volume ($\Delta V/V$) range from 0.1 percent for MnCrSb to 1.0 percent for FeRh and +2.0 to 3.0 percent for MnAs. Note the significantly larger expansion coefficient for the FeRh and MnAs compounds. Iron Rhodium (FeRh) is unique in that its expansion is uniform in all directions. If these materials are cast or formed by powder metallurgical techniques into desired sensor configurations, an average value of dimensional and volumetric change can be obtained because the crystals are nonoriented.

Certain of the known, first order transition materials which exhibit an abrupt change in volumetric characteristics at transition temperatures are manganese arsenide, iron rhodium, chromium doped manganese antimonide as listed above. In addition to these materials, there are a number of known temperature responsive hydrocarbon waxes such as those used in the thermostatic actuator described in an article by J. S. Friesmuth and J. K. Gould, entitled "High-Force Thermostatic Actuators," appearing in *Product Engineering* magazine—July 11, 1960 issue. There are also a number of temperature-sensitive fluids which have a high coefficient of thermal expansion, such as those employed in the thermal actuator described in U.S. Pat. Ser. No. 3,019,653 for "Thermal Actuators," F. Swales et al. inventors, issued Feb. 6, 1962. A further known first order transition material which exhibits this abrupt change in dimensional characteristics at prescribed transition temperatures are the titanium-nickel alloys containing approximately 55 percent by weight nickel, developed by the U. S. Naval Ordnance Laboratory at White Oak, Maryland, and identified under the trade name "Nitinol" alloys.

Figure 7:
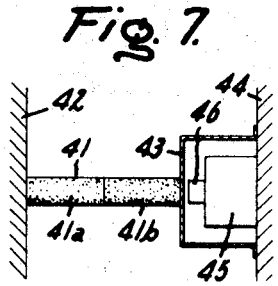
FIG. 7 is a functional sketch of a dimensional or volumetric expansion pilot contact and sensor relay switch also constructed in accordance with the present invention.

FIG. 7 of the drawings illustrates the construction of a temperature responsive, pilot contact and sensor relay employing the change in dimensional properties of certain of the first order transition materials listed above. This relay is comprised by a physically expandable actuating member 41 shaped in the form of an elongated tube and comprised by any of the first order transition materials listed above. For example, the tube 41 can be fabricated from a moulded composition of manganese arsenide and a suitable binder, such as the "RTV" silicone adhesive manufactured and sold by the Silicone Products Department of the General Electric Company. Preferably, the tube 41 is formed into two parts 41a and 41b so that it exhibits both a high temperature and a low temperature transition as illustrated by the characteristic curve shown in FIG. 8 of the drawings. The two separate compositions may be moulded in the form of the tube and then sintered in accordance with well known powder metallurgical techniques. The tube 41 is secured to a suitable support shown at 42 which in effect is immovable and has its remaining free end secured to the flexible fingers 43 of a bracket, the base of which is secured to a second fixed supporting member 44. Within the space defined by the fingers 43 of the mounting bracket, a conventional linearly operable snap-action, electric switch 45 is mounted so that its actuating button 46 is disposed opposite the free end of tube 41 supported by the fingers 43. The structure is so dimensioned that the actuating button 46 normally is not engaged by the end of the tube 41; however, upon an increase in temperature above the transition temperature, the end of the tube engages and actuates the switch 45. Switch 45 is one which opens after a predetermined amount of travel by the end of the tube 41, and upon cooling of tube 41, the switch automatically recloses. Hence, the structure can be made to have an operating characteristic such as that shown in FIG. 8, which is useful for example to control defrost solenoid control valve 19 in FIG. 1. In addition, to obtain the characteristic of FIG. 8, the expansion materials used in fabricating the two parts 41a and 41b of tube 41 can be made to possess a thermal hysteresis characteristic by appropriate processing at the time of the manufacture of the two part tube 41.

Figure 8:
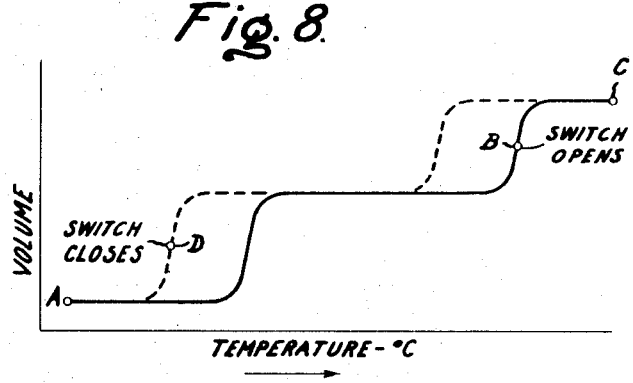
FIG. 8 is a characteristic curve illustrating the manner of operation of the volumetric expansion relay device shown in FIG. 7.

In operation, assuming that the temperature is at an initial value A in FIG. 8 which is below the low transition temperature value D then the relay will be in a closed condition, and the device of FIG. 7 will operate in the following manner with increasing temperature. Switch 45 remains closed as the temperature increases through the low transition temperature following the solid line curve. As the temperature increases through the high transition temperature B the button 46 of snap switch 45 will be engaged so that the switch is opened through the portion of the characteristic shown at B—C. Thereafter, if the temperature continues to increase to above the high value transition temperature B, the switch will remain open (because of its design) to thereby prevent current flow through the relay. Subsequently, upon cooling, the switch remains open as the temperature decreases through the high transition temperature following the dotted line curve and does not again close until it reaches point D due to the thermal hysteresis introduced by the low temperature composition. As is evident from this discussion, snap switch 45 requires considerable inward travel of button 46 to open, then remains open as the button retracts through this same point and does not reclose until there is further retraction of the button. Further cooling causes the tube 41 to contact to the region shown at A where the switch remains closed so as to continue current flow therethrough. By appropriately tailoring the low temperature part 41a, and the high temperature part 41b, the width of the thermal hysteresis provided between the points B and D, respectively, can be adjusted to a desired value.

Figure 9:
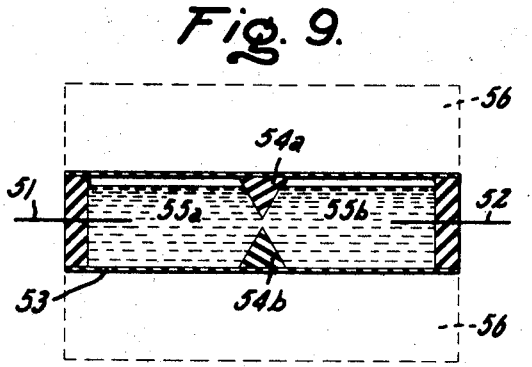
FIG. 9 is a cross-sectional view of still a different form of volumetric change pilot contact and sensor relay device constructed in accordance with the invention.

FIG. 9 of the drawings illustrates a modified form of a temperature sensitive, volumetric change switch or relay constructed in accordance with the invention. The volumetric change relay shown in FIG. 9 is comprised by a set of electrical contacts 51 and 52 physically secured in the opposite, insulating end walls of a centrally disposed flexible tube 53 formed from a flexible insulating material such as silicone rubber. The flexible envelope 53 may be substantially semispherically shaped in cross section, and in the central portion thereof has a semiannularly shaped pointed ridge 54a, 54b formed therein of a suitable electric insulating material such as hardened silicon rubber. The pointed ridge 54a, 54b is designed so that the opposed points form knife blades which upon compression of the flexible envelope 53 serve to sever the interior of the envelope 53 into two isolated compartments. The interior of the envelope 53 is filled with an electrically conductive fluid, shown generally at 55a and 55b which may comprise mercury. The ends of the contact wires 51 and 52 protrude into the two spaces 55a and 55b so as to form good electrical contact with the mercury contained within the spaces. A physically expandable actuating member is provided in the form of a surrounding jacket of volumetric change first order transition material shown generally at 56 which circumferentially surrounds the inner tube 53. The volumetric change material from which the surrounding jacket 56 is formed may comprise any of the first order transition materials listed in the preceding discussion.

In the following description of operation, assume the temperature of the surrounding environment in which the sensor relay shown in FIG. 9 is disposed, initially is below the transition temperature of the volumetric change material comprising the outer surrounding jacket 56. Under these circumstances, the jacket will assume its normal proportions so that the knife blades 54a and 54b are separated, and the mercury in the two chambers 55a and 55b forms a continuous electrically conducting path between the two contact wires 51 and 52. Thereafter, as the temperature increases, the volumetric change material will cause the knife blades to be squeezed together until it reaches a point where the knife blades 54a, 54b sever the mercury column interconnecting the two chambers 55a and 55b to thereby interrupt current flow between the two contacts 51 and 52. Upon cooling, the reverse process takes place to thereby reestablish an electrically conducting path between the two contacts 51 and 52. Of course, by proper processing of the volumetric change material comprising surrounding jacket 56, the relay may be made to possess thermal hysteresis and thereby provide two-point temperature control for a temperature regulation system in which it is incorporated, such as that shown in FIG. 1.

As a modification of the volumetric change device shown in FIG. 9, consider that the knife edges 54a and 54b comprise valving members, and that in place of the mercury in chambers 55a and 55b, and contacts 51 and 52, that the contacts 51 and 52 in fact comprise tubes for supplying gas or liquid to and from chambers 55a and 55b. If thus modified, the device shown in FIG. 9 could be used to valve on and off the flow of a refrigerant gas (or the like) directly in place of acting through relay contacts, solenoid actuated valves, electric motors, etc.

Temperature Sensitive Materials Exhibiting Change in Electrical Resistivity

FIG. 10 of the drawings illustrates a form of temperature sensitive pilot sensor device which in effect constitutes a bulk resistor fabricated from a first order transition material whose resistivity to electric current flow changes drastically at present transition temperatures. A number of the first order transition materials previously listed hereinbefore exhibit this change in electrical resistivity at readily identifiable transition temperatures; however, the preferred material for fabrication of such a change in resistance device is manganese arsenide. The change in electrical resistivity versus change in temperature characteristics of manganese arsenide is shown in FIG. 11 of the drawings wherein it can be seen that at the transition temperature (which can be properly selected by appropriate processing of the composition) there is a change in electrical resistivity of about 400 percent. Also, by appropriate processing and/or combination of compositions having different transition temperatures the change in electrical resistivity device can be made to exhibit a thermal hysteresis as indicated by the dotted curve in FIG. 11. Here again, the width of the thermal hysteresis can be appropriately gauged to a specific application.

As stated above, other of the known first order transition materials besides manganese arsenide exhibit a sharp change in electrical resistivity at identifiable transition temperatures. MnCrSb and FeRh both exhibit such change in electrical resistivity characteristics at the transition region; however, the resistivity characteristic of these materials has a negative slope which imposes certain limitations on the usefulness of these materials in the fabrication of resistance control devices. Another form of first order transition material suitable for use in fabricating resistance control elements, is described in U.S. Pat. Ser. No. 3,138,686 entitled, "Thermal Switch Device," by F. P. Mittoff and Robert H. Pry, issued June 23, 1964. The materials described in U.S. Pat. Ser. No. 3,138,686 comprise mixtures of a solid, crystalline insulating material having a specific melting point corresponding to the transition temperature desired, and having finely divided electrically conductive material (such as carbon granules) concentrated at the grain boundaries of the crystals of the said crystalline insulating material.

Still another form of first order transition material is a self-renewing heat sensitive resistor comprised of conductive particles dispersed in a plastic matrix of polyethylene or phenolic which is manufactured and sold commercially by the Polyelectric Corporation of Larchmont, N. Y. This material, when heated above a predesigned transition temperature, exhibits an abrupt rise in resistance of about 150 percent over its cold resistance value. Still another such material has been manufactured and sold by the General Electric Company under the trade name, "Thermosol." This is a temperature sensitive material which exhibits a sharp change in its electrical resistivity characteristics upon passing through a critical transition temperature. A further known material suitable for employment in the present invention has been developed by Hitachi, Ltd., of Tokyo, Japan and is marketed under the trade name, "Critesistor." This material consists essentially of a binary or ternary oxide system compound that is a mixture of vanadium oxide, acidic metal oxide (P, B, Si, etc.) and basic metal oxide (Mg, Ca, Ba, Pb, etc.). The mixture is chemically treated, molded to a desired shape, and sintered in an adequate reducing atmosphere. The subsequent quenching operation is closely controlled to obtain desired operating characteristics in the resulting "Critesistor."

In order to employ the change in resistivity type of sensor such as shown at 61 in FIG. 10 in a control circuit, the two terminals thereof (a) and (c) may be connected to the correspondingly marked terminals of the system shown in FIG. 1. By connection in this manner, the change in electrical resistivity device will be interconnected between the control gate of the gate controlled, solid-state, triac semiconductor switching device 21 and the source of electric current 13 through the defrost reversing valve 19. In operation, the device is designed such that its electrical resistivity prior to passing through the transition temperature prevents any substantial flow of gating-on current to the triac, and at the transition temperature allows such flow. If desired, the precise point on the operating characteristic curve of the resistor at which the device operates can be established by the provision of a bias current through the resistor sufficient to heat it up to the precise point desired. It should be noted, that should such a biasing arrangement be employed, it would allow for fine controlling the operating characteristics of a remotely located temperature sensing resistor from a conveniently located current controller. For the system shown in FIG. 1, the change in electrical resistivity, temperature sensitive device 16 should be fabricated from first order transition materials exhibiting a negative slope in the transition temperature region such as chromium doped manganese antimonide and iron rhodium, etc. However, for a defrost sensor such as 23 in FIG. 1, the manganese arsenide characteristics shown in FIG. 11 would be ideal, and hence the defrost sensor 23 should be fabricated from MnAs or a similar material.

Overall System Variations

FIGS. 1A and 1B show modifications of the basic refrigeration control system illustrated in FIG. 1. To modify the system of FIG. 1 to include the variations shown in FIGS. 1A and 1B all that is required is to connect the terminals (a), (b), and (c) to the correspondingly marked terminals of the system shown in FIG. 1, and terminals (c) and (d) of element 23 to the points indicated. The FIG. 1A variation is comprised by a pair of back-to-back, reverse polarity, parallel connected silicon controlled rectifiers 62 and 63 connected in place of the triac 21. The back-to-back silicon controlled rectifiers (hereinafter referred to as SCR's) are the equivalent of the triac 21 in that they are capable of conducting current in each of two directions when connected in the manner shown in FIG. 1A. Such a configuration may be necessary for certain current and voltage ratings wherein suitable SCR's are available and triacs of equivalent ratings are not. Additionally, it might be noted that in the case of the back-to-back SCR's 62 and 63, additional circuitry in the form of clamping diodes are required in order to assure that only one of the reverse polarity, parallel connected SCR's is gated-on during each half cycle of the supply alternating current.

FIG. 1B of the drawings illustrates a form of solid-state semiconductor switching device comprised by a PNP power transistor connected in a diode bridge. The arrangement is such that conduction through the transistor is always in the same direction through alternate, diagonal pairs of diodes. Additional arrangements employing light or magnetically activated SCR's or transistors, diacs, etc., are believed obvious to those skilled in the art.

Figure 2:
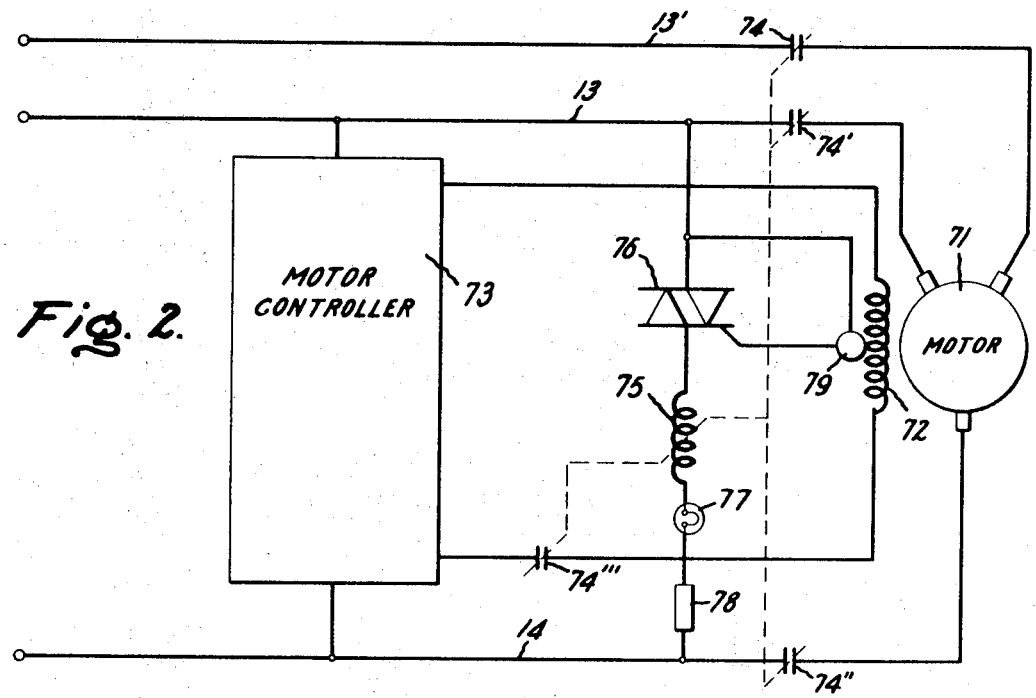
FIG. 2 is a functional block diagram of a different form of improved, solid-state electronic temperature regulation system constructed in accordance with the principles of the present invention and intended for use as a motor winding insulation temperature regulation system.

FIG. 2 of the drawings illustrates a different form of temperature regulation system constructed in accordance with the invention and employing any of the new and improved pilot contact and sensor devices illustrated in FIGS. 3 through 9 of the drawings. The temperature regulation system shown in FIG. 2 comprises a motor winding overheat safety system for interrupting operation of an electric motor upon the temperature of the field winding thereof rising above some predetermined safe value. For this purpose, the temperature regulation system shown in FIG. 2 includes a three phase, synchronous electric motor 71 having a field winding 72 which is excited from a motor controller circuit shown generally at 73 of conventional construction. Both the electric motor 71 and the motor controller circuit 73 are excited from the alternating current supply terminals 13, 13' and 14 through normally closed contacts 74, 74' and 74'' of a solenoid actuated relay. The output of the motor controller circuit 73 is connected across the field winding 72 through the normally closed contacts 74''' of the solenoid actuated relay. The solenoid winding of the solenoid relay is shown at 75 and is connected in series circuit relationship with a triac 76, an indicating lamp 77, and a current limiting resistor 78, the series circuit thus comprised being connected across the supply terminals 13 and 14. The triac 76 has its control gate connected to the output of a pilot contact and sensor device 79 which may comprise any of the devices shown and described with relation to FIGS. 3 through 9 of the drawings.

In operation, the motor 71 (which may comprise a three-phase synchronous motor whose armature is supplied from the supply lines 13, 13' and 14), during normal operation will have a direct current supplied to the field winding 72 thereof from the motor controller 73 for excitation purposes. For so long as the motor operates properly, there is no rise in temperature of the field winding 72 above a predesigned safe value, and the circuit will operate in a well-known manner to drive the motor 71. However, in the event of an overload, etc., which causes the temperature of the field winding 72 to rise above some predetermined safe level, the pilot contact and sensor 79 will function in the previously described manner to supply a gating-on current to the control gate of triac 76. Upon this occurrence, triac 76 will be rendered conductive so as to energize the actuating winding 75, and cause the normally closed contacts 74, 74', 74'' and 74''' to open. Concurrently, the indicating lamp 77 will provide a visual indication of the overheated condition of the winding 72. The relay 74 may be of the self-resetting type which resets immediately upon its actuating winding being deenergized. Thus, upon the motor winding being cooled to a temperature value below the predesigned safe value, the sensor contacts 79 will open, thereby disenabling triac 76 and allowing the relay contacts 74—74''' to return to their normally closed position.

From a consideration of the above description, it will be appreciated that the transition temperature of the first order transition materials employed in fabricating the pilot contact and sensor devices, is a function of the composition of the compound and its processing during manufacture. Thus, it will be appreciated that by properly controlling the initial manufacture of the sensor devices, no subsequent adjustment, etc., of the sensors are required or needed. The transition temperatures will remain stable with repeated cycling and in spite of mechanical shocks, vibrations, etc., which otherwise would cause conventional electromechanical types of sensors to become misaligned. Accordingly, it will be appreciated that the invention makes available new and improved solid-state temperature regulation systems employing all solid-state devices which are not easily misaligned due to mechanical and thermal stresses caused by shock, vibration, high temperatures, etc. The systems are capable of providing two point-stepped control as explained above wherein the control point is different for increasing temperatures from that employed for decreasing temperatures. The new and improved solid-state systems made available by the invention also provide abrupt, snap-action changes at the control point with respect to time in response to changes in temperature which render them highly reliable in operation. The systems are designed in a manner such that the pilot contacts associated with the sensors, are not required to carry load current. Hence, their fabrication is simplified and their operating life can be extended.

Having described several embodiments of new and improved temperature regulating systems and solid-state sensors constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What we claim as new and desire to secure by Letters Patent of the United States is:

1. A temperature responsive pilot contact and sensor relay for two-point temperature control comprising:

a mechanically operated electrical switch movable by the application of linear force between open and closed positions, a two-part, temperature responsive, physically expandable and contractable actuating member mounted adjacent to said switch to apply linear force thereto by change of one of its dimensions, wherein both parts expand upon a change in temperature in one direction to increase by increments the change in said dimension and both parts contract upon a change of temperature in the other direction to decrease by increments the change in said dimension, each part of said actuating member being comprised of a first order narrow transition temperature metallic compound which exhibits a snap-action abrupt change in volume properties in response to variations in temperature over a given range, and further has thermal hysteresis characteristics so that the transition temperature for increasing temperatures is different from the transition temperature for decreasing temperatures, wherein one part comprises a metallic compound with a high transition temperature and the other part comprises a different metallic compound with a low transition temperature.

2. A temperature responsive pilot contact and sensor relay according to claim 1 wherein said first order transition materials are selected from the class comprising manganese arsenide, iron rhodium, and chromium doped manganese antimonide.